US006611731B2

(12) United States Patent
Duffin

(10) Patent No.: US 6,611,731 B2
(45) Date of Patent: *Aug. 26, 2003

(54) MICROMACHINING AEROFOIL COMPONENTS

(75) Inventor: Jason E. Duffin, Leicestershire (GB)

(73) Assignee: M J Technologies Limited, Leicestershire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/200,619

(22) Filed: Jul. 22, 2002

(65) Prior Publication Data

US 2003/0004606 A1 Jan. 2, 2003

Related U.S. Application Data

(63) Continuation-in-part of application No. 09/460,017, filed on Dec. 13, 1999, now Pat. No. 6,490,499.

(51) Int. Cl.⁷ .............................................. B23K 26/00
(52) U.S. Cl. ...................................... 700/187; 700/192
(58) Field of Search ................................ 700/192, 193, 700/187; 219/121.7, 121.71

(56) References Cited

U.S. PATENT DOCUMENTS

| 4,737,613 A | 4/1988 | Frye ...................... 219/121.71 |
| 4,811,253 A | 3/1989 | Johns ......................... 702/168 |
| 5,125,035 A | * 6/1992 | McCarthy et al. .......... 382/141 |
| 5,222,617 A | 6/1993 | Gregory et al. ......... 219/121.71 |
| 5,777,294 A | 7/1998 | Sugahara et al. ...... 219/121.67 |
| 5,856,649 A | 1/1999 | Yamazaki et al. ..... 219/121.67 |
| 6,054,673 A | 4/2000 | Chen ..................... 219/121.71 |

OTHER PUBLICATIONS

Copy of Search Report conducted by British Patent Office.

* cited by examiner

Primary Examiner—Leo Picard
Assistant Examiner—Alexander Kosowski
(74) Attorney, Agent, or Firm—Buchanan Ingersoll, P.C.

(57) ABSTRACT

The method is suitable for the micromachining of accurately aligned holes in the aerofoil surface of a component such as a jet engine turbine blade or vane which comprises a ground anchorage portion and a cast aerofoil portion. The method uses a micromachining apparatus which is pre-programmed to machine holes in the aerofoil surface when that surface is in a predefined reference position and orientation in the apparatus. Initially the component is mounted in the micromachining apparatus by means of its anchorage portion. At least one probe is then moved into contact with the surface of the cast aerofoil portion to derive the positions of selected points on that aerofoil portion. From the derived position data, angular and linear offset data may be calculated to define the deviation of that cast aerofoil portion from the reference position and orientation defined in the computer memory of the micromachining apparatus. That angular and linear offset data is applied to the computer program resident in the micromachining apparatus to control the movement of the drilling head relative to the aerofoil surface and to machine the air holes in the aerofoil surface without having to remove the component from the apparatus.

6 Claims, 1 Drawing Sheet

MICROMACHINING AEROFOIL COMPONENTS

CROSS REFERENCE TO RELATED APPLICATION

This is a continuation-in-part application of U.S. patent application Ser. No. 09/460,017, filed Dec. 13, 1999, now U.S. Pat. No. 6,490,499.

BACKGROUND OF THE INVENTION

1. Field of the Invention

The invention relates to a method and apparatus for the micromachining of aerofoil surfaces, particularly the turbine blades and vanes of jet engines and other high precision turbines.

2. Description of the Related Art

A turbine blade or vane of a modern jet engine has two distinct parts: an anchorage portion and an aerofoil blade portion. The anchorage portion is ground to create one or more flat planar locating faces which securely and precisely anchor the blade or vane in the engine. The blade portion is cast, and therefore has a surface which is finished to a lower standard of accuracy than the ground faces of the anchorage portion.

Gas turbines generally, and jet engines in particular, run at very high internal temperatures, often higher than the melting point of the alloy used for the turbine blades or vanes. The blades or vanes are therefore protected from melting by creating a film of cooling air over all of the aerofoil surfaces that would otherwise be exposed to the hot combustion gases. The cooling air is discharged from a plenum chamber internally of the blade or vane, and out through an array of small and accurately aligned and located holes in the aerofoil surface. Those holes are typically micromachined using a micromachining tool mounted with five degrees of movement relative to the aerofoil surface of the blade or vane.

A problem associated with the micromachining of the air holes in the aerofoil surface is the need accurately to position the holes relative to the aerofoil surface itself rather than relative to the mounting. The aerofoil is typically mounted in the micromachining apparatus by its machined mounting portion. Although that mounting portion is a high precision ground sub-element of the component, it may not be precisely aligned relative to the shaped aerofoil surface. Two alternative methods have been proposed for ensuring that the micromachined holes are accurately positioned relative to the aerofoil surface rather than relative to the mounting portion. Each method requires the use of a separate piece of setting or measuring equipment in the machine workshop, and each has its own associated disadvantages.

In a first method, in a setting apparatus the component is initially positioned in a compliant mounting which engages with the ground-flat faces of the anchorage portion of the component. The compliance of the compliant mounting is such as to provide the aerofoil surface of the component with at least three, and preferably five, degrees of movement in space. The compliant mounting is itself held in the setting apparatus, and jaws and probes of the setting apparatus are moved into abutment with the aerofoil surface of the component, to grip the aerofoil surface and hold the component by its aerofoil surface in a precise orientation in space. At that stage the compliant mounting is tightened and locked solid, prior to its release from the setting apparatus, so that when the assembly of component and compliant mounting is carried over to the micromachining apparatus, the component may be held by anchoring the compliant mounting against datum surfaces of the micromachining apparatus. Drilling can start immediately, because the aerofoil surface will be correctly aligned relative to those datum surfaces. Apart from the need for a separate piece of setting apparatus in the machine workshop, for the positioning of the component relative to the compliant mounting prior to tightening that compliant mounting, this method of component alignment suffers from the disadvantage that if the component is mishandled while being transported from the setting apparatus to the micromachining apparatus, the component may move in its mounting so that the accuracy of alignment can be lost.

In a second method for ensuring the accuracy of the micromachined holes relative to the aerofoil surface, the component is first mounted in a measuring apparatus which engages directly the ground faces of the anchorage portion of the component. Probes or sensors of the measuring apparatus then map the position and shape of the aerofoil surface of the component relative to the ground faces of the anchorage portion, and from the output of those probes or sensors a drilling control program is compiled, for the control of the micromachining apparatus relative to the aerofoil surface in the subsequent micromachining step. The compiled drilling control program and the component are then removed from the test rig and kept together until the micromachining is to take place. Then the component is mounted in the micromachining apparatus, the control program loaded into the micromachining apparatus, and the micromachining of the air holes takes place with accurate positioning of those air holes relative to the aerofoil surface. This method also requires a separate piece of workshop apparatus, and has the additional disadvantage that if the compiled drilling control program becomes separated from the component prior to machining, then the component must be returned to the measuring apparatus for the remeasurement of the aerofoil surface position and the compilation of a new program. A potentially much greater disadvantage of this method is that if two components and their two accompanying compiled programs are interchanged accidentally between the measuring apparatus and the micromachining apparatus, then the drilling can take place with the holes being bored in each component using the program compiled for the other component. The exchange of program information may not be apparent from a visual inspection of the finished components, but the holes will be offset or misaligned from their optimum positions relative to the respective aerofoil surfaces, and the components will be liable to early failure in the extremely demanding conditions experienced in use.

The invention has as its object the avoidance of the above problems and the establishment of a method of micromachining holes in aerofoil components in which the holes are machined accurately and consistently relative to the aerofoil surfaces and in a manner more economical than previously.

BRIEF SUMMARY OF THE INVENTION

The invention provides a method for micromachining the aerofoil surfaces of a component which comprises a ground anchorage portion and a cast aerofoil portion, which method comprises:

mounting the component in a micromachining apparatus by means of its anchorage portion, the micromachining apparatus having a computer memory storing data defining a single predefined reference position and a single predefined reference orientation of the aerofoil surface in the apparatus, and data relating to the position and orientation of holes to be machined in the aerofoil surface relative to that predefined reference position and orientation;

deriving the positions of selected points on that aerofoil portion;

calculating, from the derived position data, linear and angular offset data to define the deviation of that cast aerofoil portion from the predefined reference position and orientation; and applying that linear and angular offset data to a computer program resident in the micromachining apparatus to control the movement of a drilling head relative to the aerofoil surface and accurately to machine air holes in the aerofoil surface even when the component is mounted in the micromachining apparatus with the aerofoil portion located other than in its reference position and orientation.

The method of the invention avoids all potential for misalignment of the drilling head relative to a previously measured or set position of the aerofoil surfaces of the component being machined, because the component is never removed from one mounting and placed in another during the course of the method. The component remains in the micromachining apparatus from the beginning of the probe test run to establish the position and orientation of the aerofoil surfaces to the end of the machining process Moreover only a single set of angular and linear offset data is created and stored according to the invention, and that data is applied to the program resident in the micromachining apparatus to control, in real time, the movement of the drilling head.

The probe or probes may be mounted on the movable platform on which the drilling head is mounted, or on a similar platform, so that essentially the same motors and/or software can be used for positioning the probe or probes relative to the component as will subsequently be used for aligning the drilling head relative to the component.

Any suitable algorithm may be used for calculating from appropriate derived position data the angular and linear offsets of the aerofoil surface of the component. Preferably the derived position data are obtained from at least six probe measurements: four being the positions of two pairs of associated tangential points at which an outer curved edge of the aerofoil surface would touch tangentially two straight lines drawn in space with a known angle between them; and two being the positions of points at which mutually perpendicularly aligned probes touch the aerofoil surface and the anchorage portion of the component. If desired a reiterative measurement system can be used, so that a first set of for example six probe measurements is used to calculate offset data establishing the position and orientation of the component relative to its reference position and orientation; and a second set or subsequent sets of similar probe measurements are used in an iterative manner to check and confirm or adjust that offset data.

DETAILED DESCRIPTION OF THE INVENTION

Figure 1:
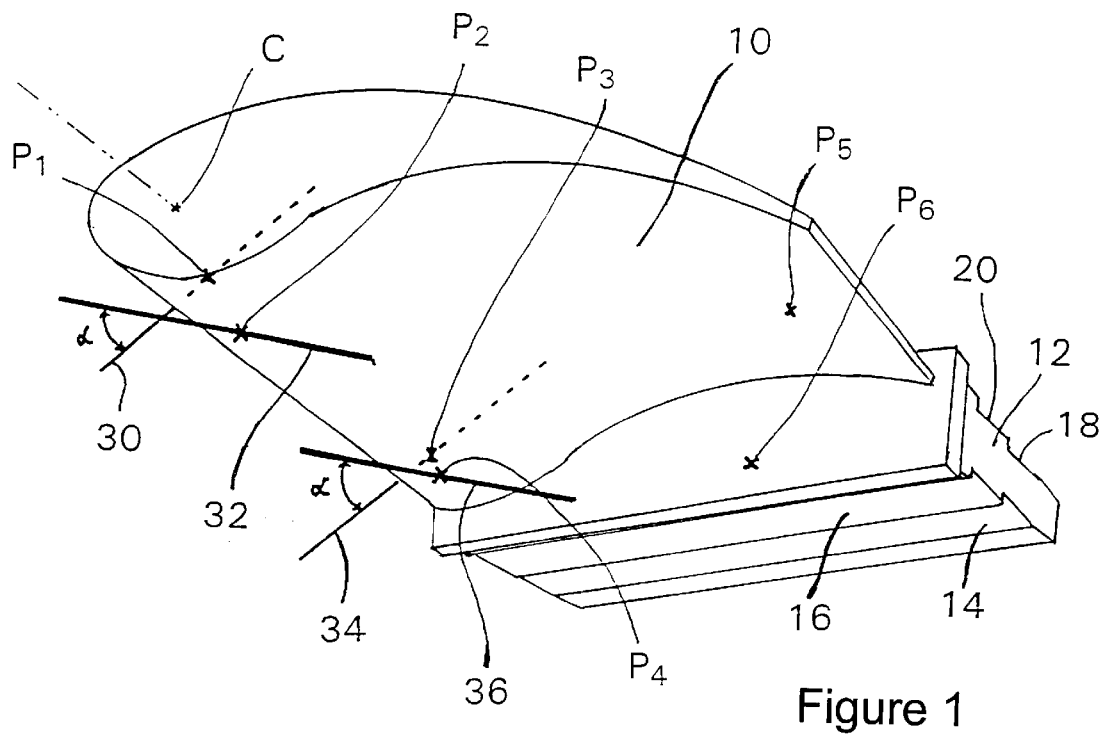
FIG. 1 is a perspective view of a component to be micromachined according to the invention, being a turbine blade.

FIG. 1 illustrates an aerofoil component to be micromachined according to the invention. The component illustrated is a turbine vane of a jet engine, and comprises an aerofoil portion 10 and a mounting portion 12. the mounting portion 12 is machined with a series of ground flats 14, 16, 18 and 20 by means of which it can be firmly and positively anchored in the jet engine.

The aerofoil surface 10 of the vane has to have machined therethrough some tens or hundreds of very accurately located and aligned air holes so that in use a curtain of air is formed over the entire aerofoil surface, that curtain of air being sufficiently coherent to protect the vane from melting in the high temperatures experienced in a modern jet engine. The method of micromachining those holes according to the invention is as follows.

Figure 2:
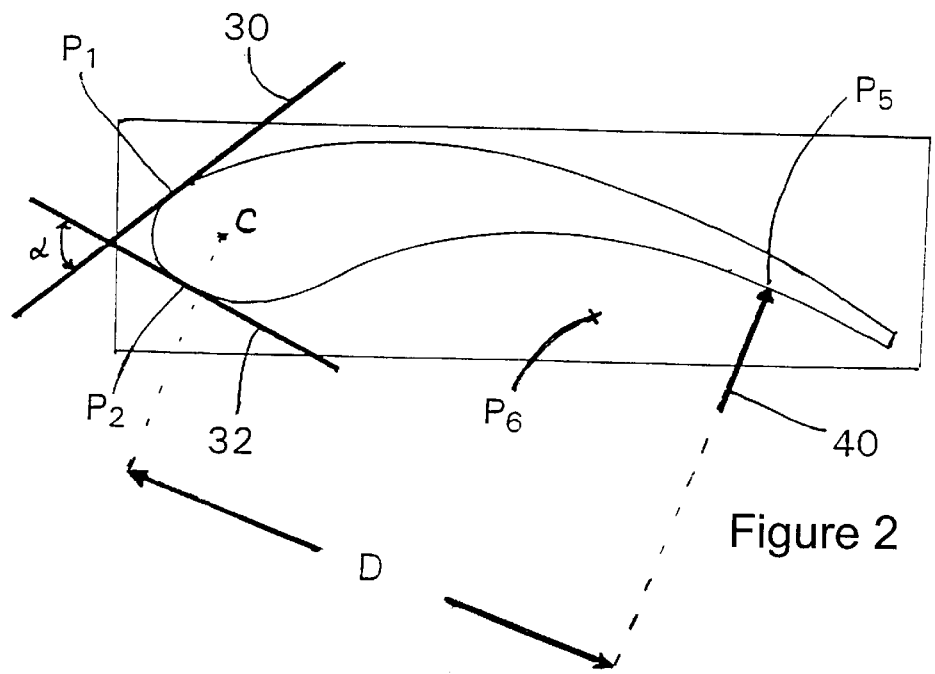
FIG. 2 is an end view of the component of FIG. 1, FIGS. 1 and 2 showing the positions of the six probe measurement points.

First, the entire component is mounted firmly on the platform of a micromachining apparatus by clamping directly onto the flat ground surfaces 14, 16, 18 and 20. The machine then moves into an initial alignment test mode. A straight probe edge of the machine, illustrated by the thick line 30 of FIGS. 1 and 2, is moved against a leading edge of the aerofoil surface 10 of the vane, until it touches the vane at a point $P_1$. The location of the straight probe edge is then recorded in computer memory. The straight edge surface is then turned through an angle $\alpha$, and again moved forwardly until it touches the aerofoil surface at a point $P_2$ as indicated in the drawings by a thick line 32. The second location of the straight probe edge is similarly recorded in computer memory. The straight probe edge is then moved to another position along the leading edge of the aerofoil surface 10, and a similar pair of measurements is taken, as shown in FIG. 1 by the thick lines 34 and 36 and the points of contact $P_3$ and $P_4$. The angle $\alpha$, and the four measurements taken when the straight probe edge touched the aerofoil surface at points $P_1$, $P_2$, $P_3$ and $P_4$, are sufficient to define x and y coordinates of the aerofoil surface 10. The leading edge of the aerofoil surface 10 can be approximated to a part-cylindrical surface, and the position and orientation in space of the associated cylindrical axis C is therefore known.

Instead of a straight probe edge as illustrated by the thick line 30, the alignment test mode may utilise a point probe moving in a predefined sequence or pattern and linked to an algorithm in computer memory from which the location can be computed of points at which the outer curved edge of the aerofoil surface would touch tangentially two straight lines drawn in space with the predefined angle $\alpha$ between them.

A point probe, illustrated in FIG. 2 by a heavy line and arrowhead 40, is then moved against a trailing edge of the aerofoil surface 10, a predefined distance D from the axis C. That probe 40 contacts the aerofoil surface 10 at a point $P_5$, which is sufficient to define the angular rotation of the aerofoil surface 10 around the axis C. Finally the position of the aerofoil surface 10 longitudinally of the axis C can be established by turning the probe 40 through 90° and contacting it against the end face of the anchorage portion 20, to identify the position of the point $P_6$.

From the measured points $P_1$ to $P_6$, the precise position of the aerofoil surface 10 can be accurately established, and according to the invention that position is represented by angular and linear offset data which define the deviation of the position of that aerofoil surface 10 from an expected position as pre-programmed into the micromachining apparatus. The offsets may be very small, perhaps less than 1° of angular offset or less than 1 mm of linear offset, but irregularities of that order of magnitude could seriously interfere with the proper working of the turbine vane if they resulted in the air holes being drilled in the wrong locations.

The above angular and linear offset data is used in real time to offset the alignment of the drilling head of the micromachining apparatus, so that as the air holes are drilled into the aerofoil surface 10, they are drilled into the precise intended locations with reference to the aerofoil surface 10, and not with reference to the mounting portion 20.

The drilling head on the micromachining apparatus may be a laser head, an electrochemical machining (ECM) head, an electrical discharge machining (EDM) head, a water jet drill head, a particle beam head or any other micromachining head capable of drilling fine and accurate holes in the aerofoil surface. More than one type of the above drilling heads may be mounted on the same movable platform or on similar platforms, to obtain the advantages inherent in each type of drilling operation in the same apparatus. For example a single movable platform carrying a laser head and an EDM head combines the speed of laser drilling for creation of an initial hole in the aerofoil surface with the accuracy of EDM drilling for shaping and finishing that hole.

When the machining head is or includes a laser head, the apparatus may also be used for laser cladding and/or laser welding as well as for hole drilling. All of the above advantages obtained with the method of hole drilling according to the invention are then obtainable with the other machining functions as well.

What is claimed is:

1. A method for micromachining the aerofoil surfaces of a component which comprises a ground anchorage portion and a cast aerofoil portion, which method comprises:

mounting the component in a micromachining apparatus by means of its anchorage portion, the micromachining apparatus having a computer memory storing data defining a single predefined reference position and a single predefined reference orientation of the aerofoil surface in the apparatus, and data relating to the position and orientation of holes to be machined in the aerofoil surface relative to that predefined reference position and orientation;

deriving the positions of selected points on that aerofoil portion;

calculating, from the derived position data, linear and angular offset data to define the deviation of that cast aerofoil portion from the predefined reference position and orientation; and applying that linear and angular offset data to a computer program resident in the micromachining apparatus to control the movement of a drilling head relative to the aerofoil surface and accurately to machine air holes in the aerofoil surface even when the component is mounted in the micromachining apparatus with the aerofoil portion located other than in its reference position and orientation.

2. A method according to claim 1, wherein the or each probe is mounted on a movable platform and the positions of the selected points are derived by using at least one probe mounted on the movable platform on which the drilling head is mounted.

3. A method according to claim 1, wherein the derived position data are obtained from at least six probe measurements: four being the positions of two pairs of associated tangent points of which each pair defines a point at which an outer curved edge of the aerofoil surface would touch tangentially two straight lines drawn in space with a known angle between them; and two being the positions of points at which mutually perpendicularly aligned probes touch the aerofoil and anchorage portions of the component.

4. A method according to claim 2, wherein, the derived position data are obtained from at least six probe measurements: four being the positions of two pairs of associated tangent points of which each pair defines a point at which an outer curved edge of the aerofoil surface would touch tangentially two straight lines drawn in space with a known angle between them; and two being the positions of points at which mutually perpendicularly aligned probes touch the aerofoil and anchorage portions of the component.

5. The method according to claim 1, wherein the micromachining apparatus comprises a machining device selected from the group consisting of a laser head, an electrochemical machining head, an electrical discharge machining head and a water jet drill.

6. The method according to claim 1, wherein the micromachining apparatus comprises at least two machining devices selected from the group consisting of a laser head, an electrochemical machining head, an electrical discharge machining head and a water jet drill.

* * * * *